United States Patent
Leong et al.

(10) Patent No.: US 9,014,185 B2
(45) Date of Patent: *Apr. 21, 2015

(54) STATE-BASED FILTERING ON A PACKET SWITCH APPLIANCE

(71) Applicant: Gigamon LLC, Milpitas, CA (US)

(72) Inventors: Patrick Pak Tak Leong, Palo Alto, CA (US); King L. Won, San Jose, CA (US); Jeff Sternin, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/649,020

(22) Filed: Oct. 10, 2012

(65) Prior Publication Data

US 2013/0034107 A1     Feb. 7, 2013

Related U.S. Application Data

(63) Continuation of application No. 12/148,481, filed on Apr. 17, 2008, now Pat. No. 8,315,256.

(51) Int. Cl.
*H04L 12/70* (2013.01)
*H04L 12/46* (2006.01)
*H04L 12/931* (2013.01)

(52) U.S. Cl.
CPC ............ *H04L 12/4625* (2013.01); *H04L 49/20* (2013.01); *H04L 49/355* (2013.01)

(58) Field of Classification Search
None
See application file for complete search history.

(56) References Cited

U.S. PATENT DOCUMENTS

| | | | |
|---|---|---|---|
| 6,816,455 B2 * | 11/2004 | Goldberg et al. | 370/230 |
| 6,839,349 B2 * | 1/2005 | Ambe et al. | 370/390 |
| 7,149,230 B2 * | 12/2006 | Coffin et al. | 370/536 |
| 7,848,326 B1 | 12/2010 | Leong et al. | |
| 2004/0013112 A1 * | 1/2004 | Goldberg et al. | 370/389 |
| 2005/0053073 A1 * | 3/2005 | Kloth et al. | 370/395.41 |
| 2005/0190772 A1 * | 9/2005 | Tsai et al. | 370/395.52 |
| 2005/0190799 A1 * | 9/2005 | Coffin et al. | 370/516 |
| 2005/0229246 A1 * | 10/2005 | Rajagopal et al. | 726/14 |
| 2005/0254490 A1 | 11/2005 | Gallatin et al. | |
| 2005/0265248 A1 | 12/2005 | Gallatin et al. | |
| 2005/0265364 A1 | 12/2005 | Gallatin et al. | |
| 2005/0271065 A1 * | 12/2005 | Gallatin et al. | 370/401 |
| 2006/0067231 A1 * | 3/2006 | Ikoma et al. | 370/235 |
| 2007/0047457 A1 * | 3/2007 | Harijono et al. | 370/250 |
| 2007/0147380 A1 * | 6/2007 | Ormazabal et al. | 370/392 |

(Continued)

OTHER PUBLICATIONS

Non-final Office Action dated Dec. 1, 2009, for U.S. Appl. No. 12/148,481.

(Continued)

*Primary Examiner* — Robert C Scheibel
(74) *Attorney, Agent, or Firm* — Vista IP Law Group, LLP

(57) ABSTRACT

A packet switch appliance includes a plurality of ports. One of the plurality of ports is configured to operate as a network port connected to a packet-switching network. Another of the plurality of ports is configured to operate as a first instrument port connected to a network instrument. To filter packets, one or more packets or copies of packets received through the first network port are examined prior to the packets or copies of packets being sent out the first instrument port to determine a current state of a state-based protocol, which includes a plurality of potential states. A filter is created or modified for the first network port or the first instrument port based on the determined current state of the state-based protocol.

30 Claims, 7 Drawing Sheets

(56) References Cited

U.S. PATENT DOCUMENTS

Figure 1:
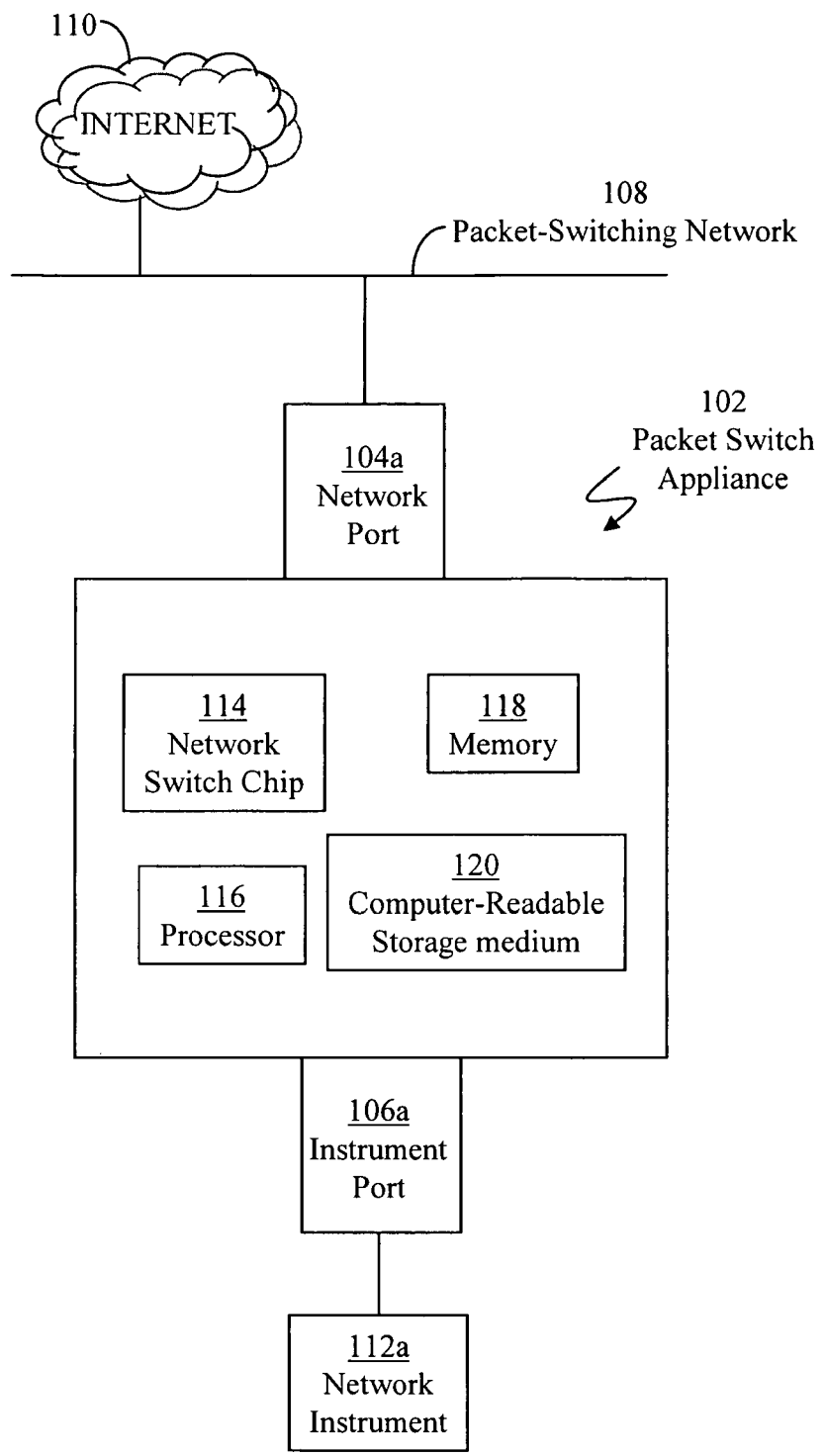

2008/0225874 A1* 9/2008 Lee .............................. 370/412
2009/0103551 A1* 4/2009 Lin .............................. 370/401

OTHER PUBLICATIONS

Final Office Action dated Mar. 25, 2010, for U.S. Appl. No. 12/148,481.
Non-final Office Action dated Nov. 9, 2010, for U.S. Appl. No. 12/148,481.
Final Office Action dated Apr. 21, 2011, for U.S. Appl. No. 12/148,481.
Advisory Action dated Jul. 12, 2011, for U.S. Appl. No. 12/148,481.
Non-final Office Action dated Jan. 18, 2012, for U.S. Appl. No. 12/148,481.
Notice of Allowance and Fee(s) Due dated Jul. 20, 2012, for U.S. Appl. No. 12/148,481.

* cited by examiner

STATE-BASED FILTERING ON A PACKET SWITCH APPLIANCE

RELATED APPLICATION DATA

This application is a continuation of U.S. patent application Ser. No. 12/148,481, filed Apr. 17, 2008, now U.S. Pat. No. 8,315,256, the entire disclosure of which is expressly incorporated by reference herein.

BACKGROUND

1. Field

The present application generally relates to packet switch appliances, and, more particularly, to state-based filtering on a packet switch appliance.

2. Related Art

Packet switch appliances can be used to forward packets in a packet-switching network, based on their address information, to their destination terminals. Typically, packet switch appliances have one or more network ports for connection to the packet-switching network. The network port of a packet switch appliance can include a filter, which either drops or forwards packets. Packet switch appliances may also have one or more instrument ports connected to one or more network instruments, typically used to monitor packet traffic, such as packet sniffers, intrusion detection systems, intrusion prevention systems, or forensic recorders.

Conventional packet switch appliances typically have static filters, which use fixed values as filter criteria. Static filters can be used to filter packets used in static protocols because static protocols have fixed offsets and attributes whose values remain fixed as defined by their respective standards. For example, source or destination port 23 in the TCP header can be used as the static filter to filter telnet packets. Static filters of conventional packet switch appliances, however, are not able to perform state-based filtering because state-based protocols have some attributes whose values may be dynamically negotiated and thus change with state changes.

SUMMARY

In one exemplary embodiment, a packet switch appliance includes a plurality of ports. One of the plurality of ports is configured to operate as a network port connected to a packet-switching network. Another of the plurality of ports is configured to operate as a first instrument port connected to a network instrument. To filter packets, one or more packets or copies of packets received through the first network port are examined prior to the packets or copies of packets being sent out the first instrument port to determine a current state of a state-based protocol, which includes a plurality of potential states. A filter is created or modified for the first network port or the first instrument port based on the determined current state of the state-based protocol.

DESCRIPTION OF DRAWING FIGURES

Figure 2:
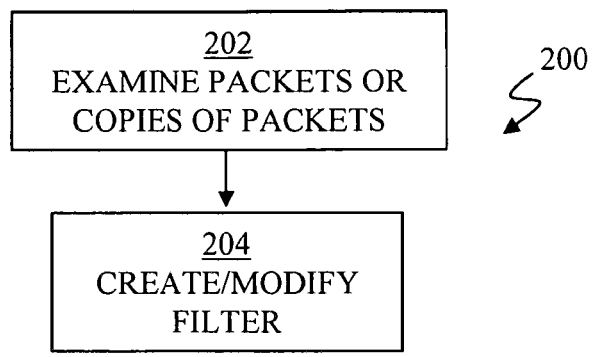
Figure 3:
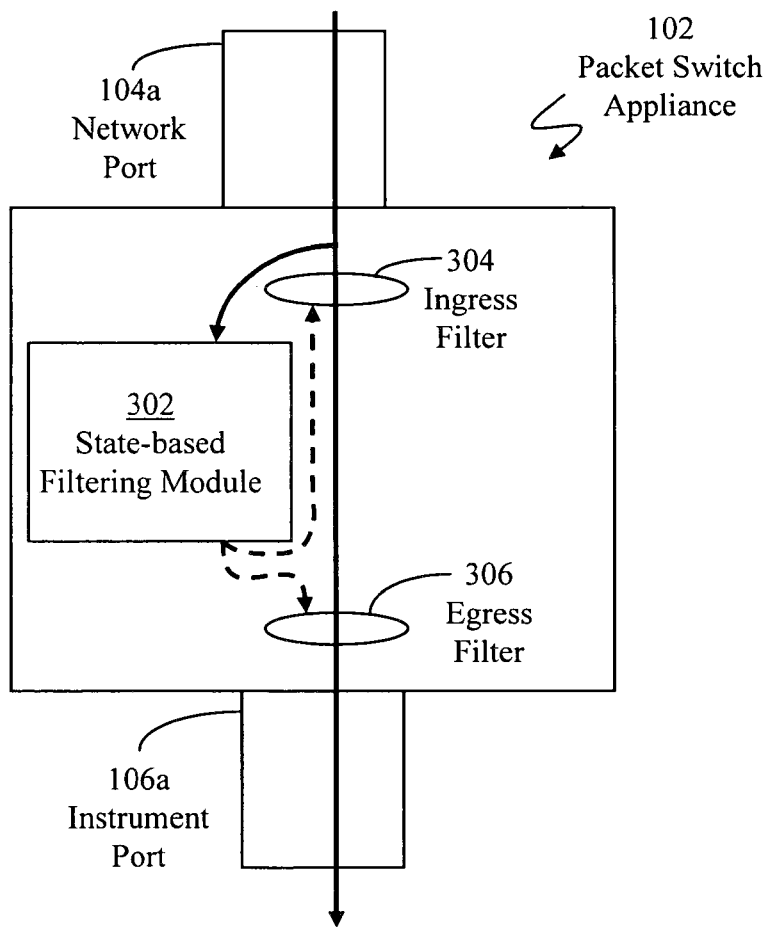
Figure 4:
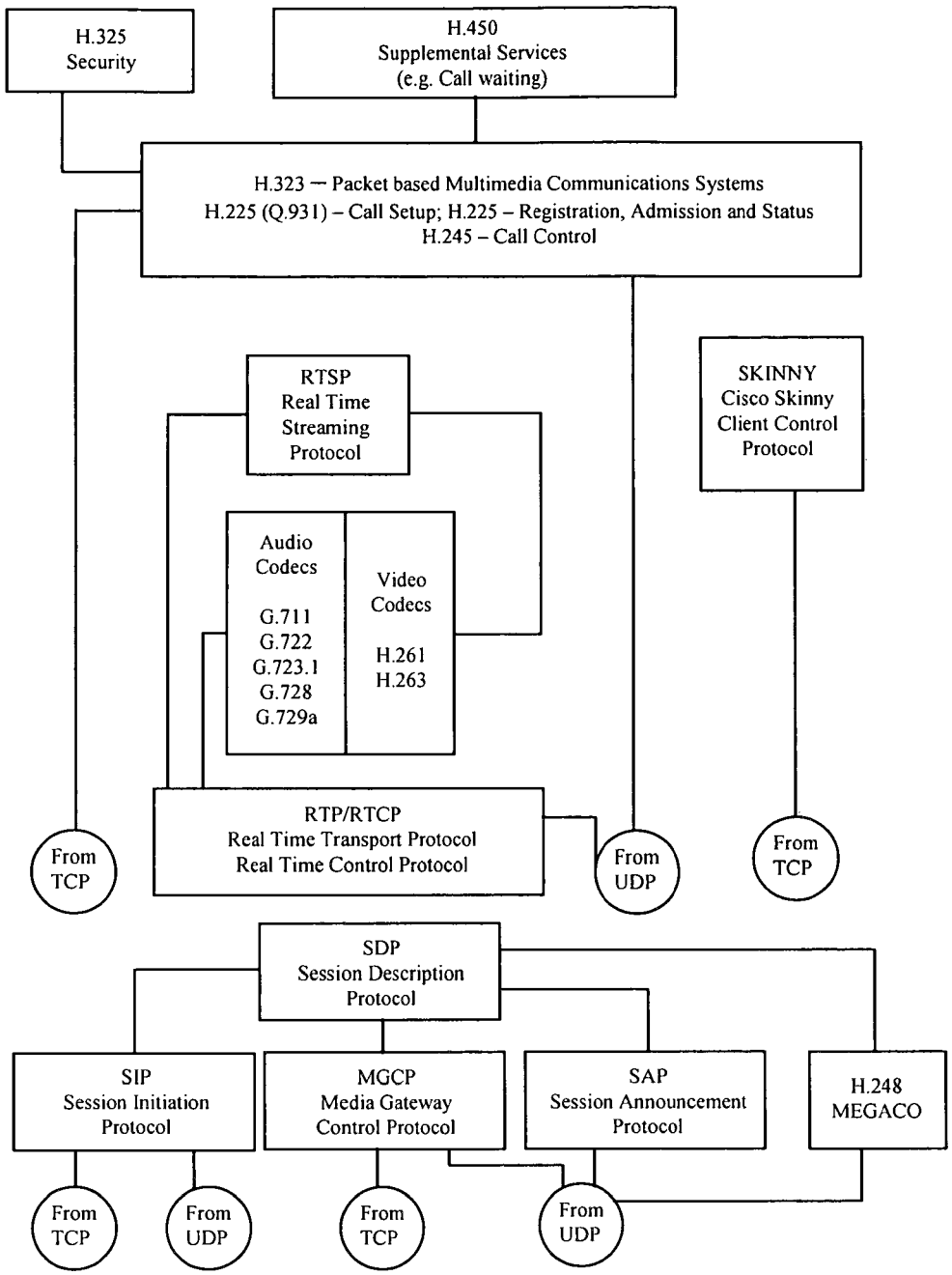
Figure 5:
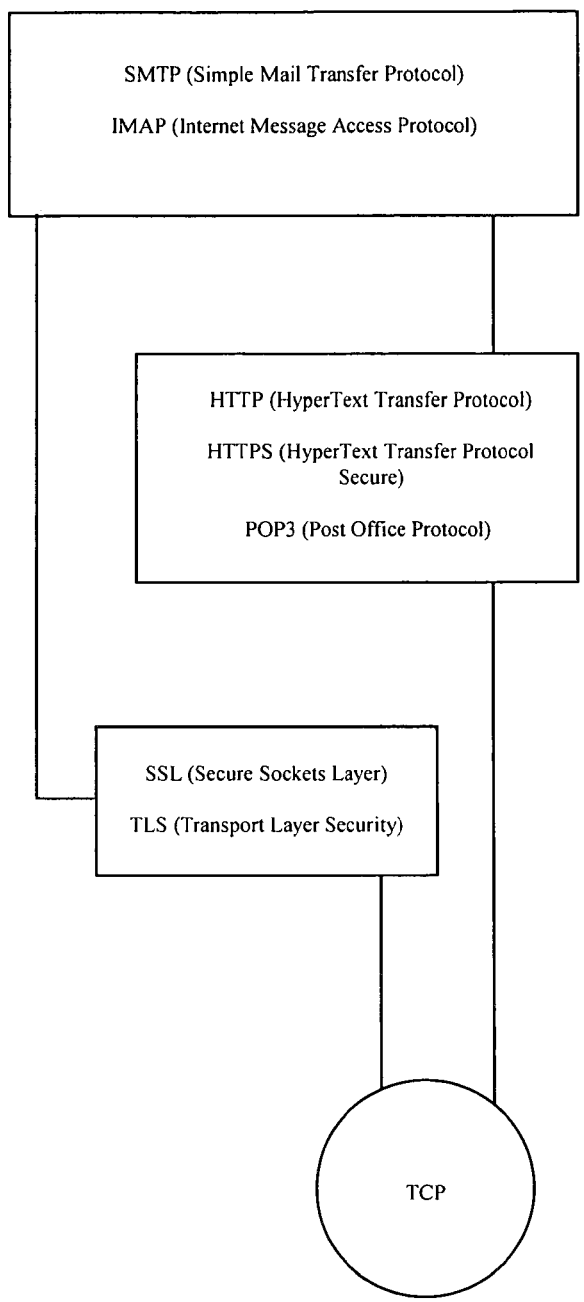
Figure 6:
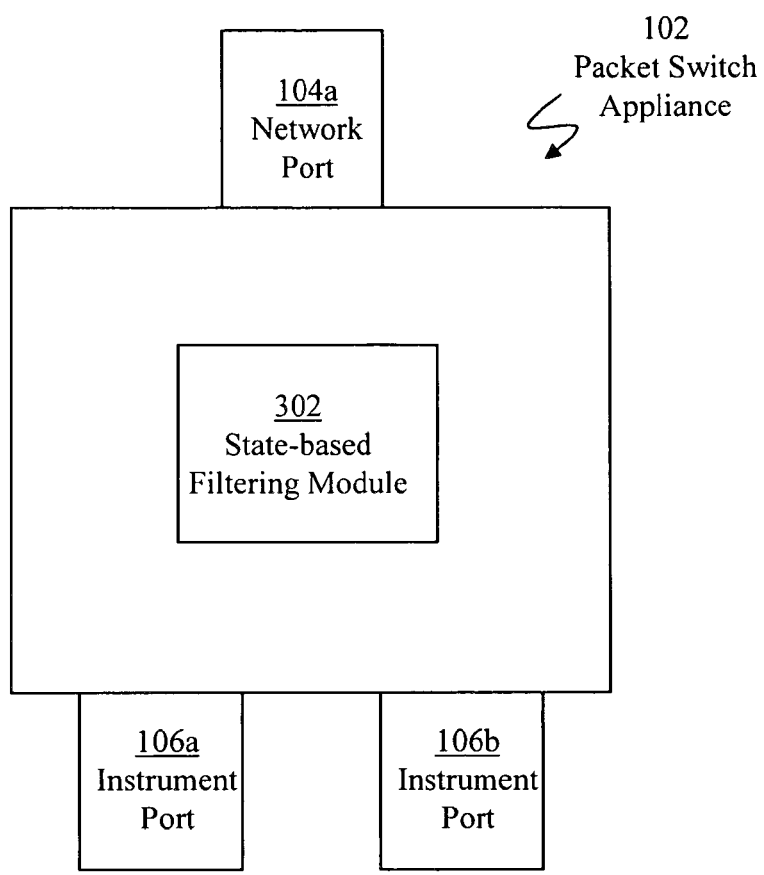
Figure 7:
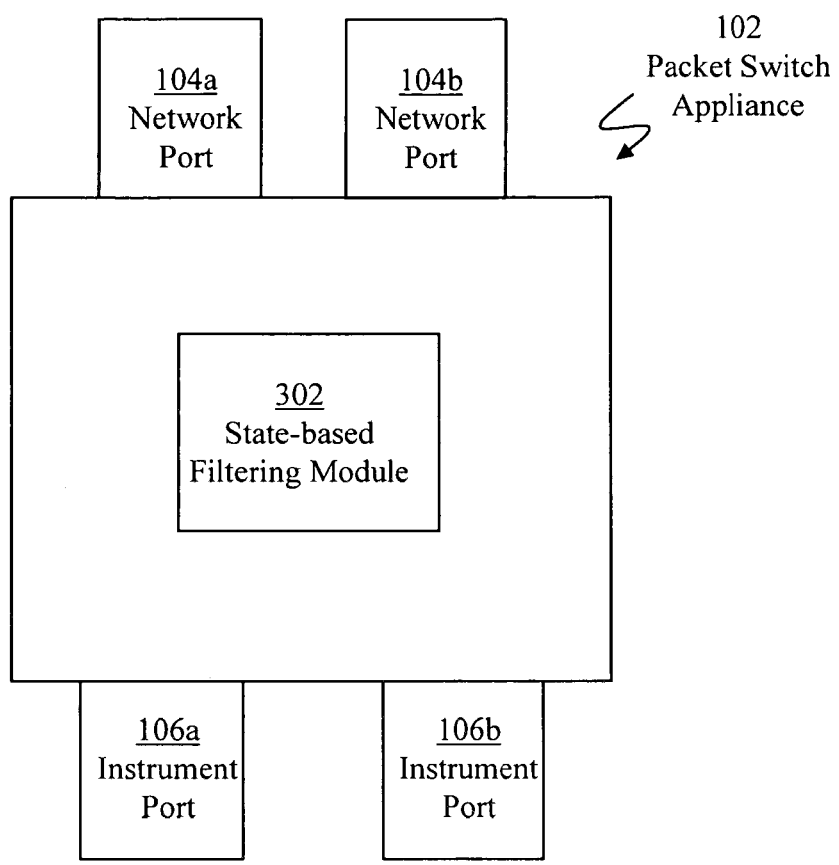
Figure 8:
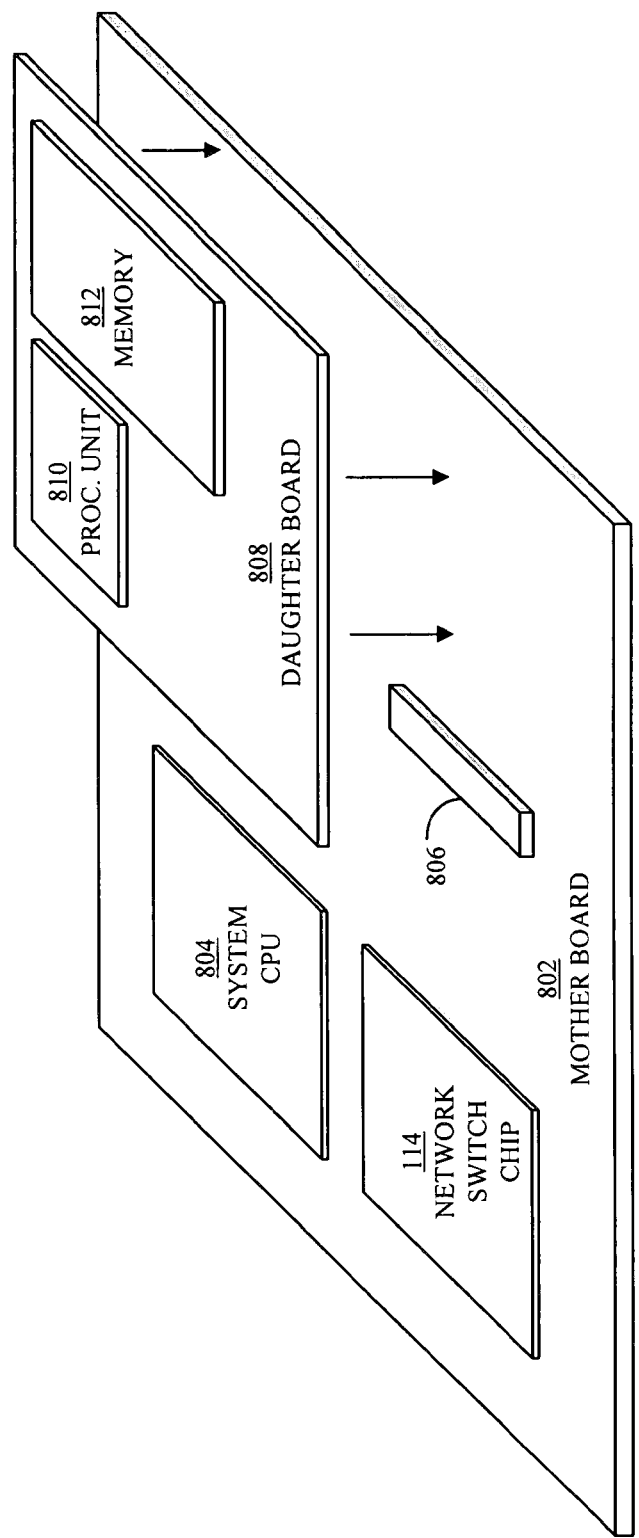

The present application can be best understood by reference to the following description taken in conjunction with the accompanying drawing figures, in which like parts may be referred to by like numerals:

FIG. 1 depicts an exemplary packet switch appliance;
FIG. 2 depicts an exemplary state-based filtering process;
FIG. 3 depicts the exemplary packet switch appliance of FIG. 1 with a state-based filtering module;
FIG. 4 depicts a hierarchy of various Voice-over-Internet Protocol (VoIP) protocols;
FIG. 5 depicts a hierarchy of various e-mail protocols; and
FIGS. 6-8 depict various exemplary packet switch appliance.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

With reference to FIG. 1, an exemplary packet switch appliance 102 is depicted. Packet switch appliance 102 includes a plurality of ports. In FIG. 1, packet switch appliance 102 is depicted with one port configured as a network port 104a, which is connected to packet-switching network 108. An additional port on packet switch appliance 102 is depicted as being configured as instrument port 106a, which is connected to network instrument 112a. Packet switch appliance 102 receives traffic through network port 104a and forwards the traffic to instrument port 106a. As will be described in more detail, packet switch appliance 102 can include additional ports configured as additional network ports and instrument ports. Packet switch appliance 102 can distribute traffic among any number of network ports and instrument ports. In distributing the traffic, packet switch appliance 102 can perform various functions, such as one-to-one, one-to-many, many-to-one, and many-to-many port distributing; ingress and egress filtering; flow-based streaming; and load balancing. For a more detailed description of these features, see U.S. patent application Ser. Nos. 11/123,273; 11/123,377; 11/123,465; and 11/123,729, which were filed on May 5, 2005, and which are incorporated herein by reference in their entireties.

FIG. 1 depicts packet-switching network 108 being connected to the Internet 110. It should be recognized, however, that packet-switching network 108 can be a private network having various types of network devices. FIG. 1 also depicts network instrument 112a connected to instrument port 106a. It should be recognized that network instrument 112a can be various types of devices, such as sniffers, intrusion detection systems (IDS), forensic recorders, and the like.

As discussed above, traffic (i.e., packets) flowing through packet switch appliance 102 can be filtered using static filters. A static filter examines a packet and makes a pass or drop decision based on one or more filter criteria. The one or more filter criteria of the static filter may be user-specified bit or byte patterns at certain offsets from the beginning of the packet. Note, the bit or byte pattern does not need to be explicitly specified by a user at a command line interface in order for the bit or byte pattern to be user specified. For example, if a user wants to filter on all telnet packets, the user may specific a "telnet" filter at a command line interface or any other user interface. Although the user did not explicitly specify the bit or byte pattern at the command line interface, the user specifying the "telnet" filter does result in the static filter using port value 23 at the transmission control protocol (TCP) header of packets as the filter criteria.

As also discussed above, state-based protocols typically include a plurality of states. One example of a state-based protocol is VoIP over session initiated protocol (SIP) protocol. VoIP includes an initialization state. SIP protocol includes a call request state to the callee. In a subsequent state, the callee acknowledges back to establish a call using real-time transport protocol (RTP) ports. In a termination state, the call is terminated. State-based protocols may also include tracking establishments of multi-protocol label switching (MPLS) label paths.

Instead of fixed values, attribute values of a state-based protocol typically change with state changes. For example, in VoIP, RTP port numbers may be dynamically negotiated during the initialization state of each call session. Thus, static filters, which use fixed values for filter criteria, cannot be used for state-based filtering.

FIG. 2 depicts an exemplary process 200 for state-based filtering of packets using packet switch appliance 102 (FIG. 1). With reference to FIG. 3, process 200 (FIG. 2) can be implemented using a state-based filtering module 302, which can be a component of packet switch appliance 102. It should be recognized that state-based filtering module 302 can be implemented as software, hardware, or combination of software and hardware. For example, state-based filtering module 302 can be implemented as computer executable instructions stored on computer-readable storage medium 120 (FIG. 1).

In step 202 (FIG. 2), one or more packets or copies of packets received through network port 104a are examined prior to the packets or copies of packets being sent out instrument port 106a. The one or more packets or copies of packets are examined to determine a current state of a state-based protocol, which has a plurality of potential states.

In step 204 (FIG. 2), a filter for network port 104a or instrument port 106a is created or modified based on the determined current state of the state-based protocol. As depicted in FIG. 3, based on the determined current state, state-based filtering module 302 can create or modify an ingress filter 304, an egress filter 306, or both ingress filter 304 and egress filter 306.

Ingress filter 304 examines a packet at network port 104a and makes a pass or drop decision at network port 104a based on one or more filter criteria. In contrast, egress filter 306 examines a packet at instrument port 106a and makes a pass or drop decision at instrument port 106a based on one or more filter criteria.

When creating an ingress filter 304 and/or egress filter 306, state-based filtering module 302 sets one or more values of the one or more filter criteria for ingress filter 304 and/or egress filter 306 based on the determined current state of the state-based protocol. The newly created ingress filter 304 and/or egress filter 306 is assigned to the network port 104a and/or instrument port 106a.

When modifying an ingress filter 304 and/or egress filter 306, state-based filtering module 302 adjusts one or more values of the one or more filter criteria of ingress filter 304 and/or egress filter 306 based on the determined current state of the state-based protocol. Note, the act of modifying includes removing an existing ingress filter 304 and/or egress filter 306 based on the determined current state of the state-based protocol.

As one exemplary use of process 200 (FIG. 2), assume a user wants to filter and pass all packets related to a VoIP call between phone numbers 5551234 and 5555678. As depicted in FIG. 3, assume packets enter network port 104a and the user wants the filtered packets to egress out of instrument port 106a. Initially, no connection exists between network port 104a and instrument port 106a. The following sets forth the steps that can be performed by state-based filtering module 302 in performing process 200 (FIG. 2):

1. Receive packets or copies of packets entering network port 104a.
2. Examine the packets or copies of packets for those that are relevant for this VoIP call (i.e., the call between phone numbers 5551234 and 5555678).
3. Determine the negotiated RTP port numbers for this VoIP call by examining the relevant packets or copies of packets.
4. During the initialization state of this VoIP call, send any packets relevant to this call to instrument port 106a so that any network instrument connected to instrument port 106a will not miss any packets relevant to this VoIP call.
5. When state-based filtering module 302 determines from examining the relevant packets or copies of packets that the initialization state of this VoIP call is completed and the RTP ports have been negotiated, perform the following steps to create/modify a filter:
    a. Establish a connection between network port 104a and instrument port 106a.
    b. Create ingress filter 304 and/or egress filter 306 looking for the negotiated RTP port numbers. In particular, one or more criteria of ingress filter 304 and/or egress filter 306 can be set to the negotiated RTP port numbers, which was determined by examining the relevant packets or copies of packets.
6. Continue to examine packets to determine the current state of this VoIP call.
7. If state-based filtering module 302 determines that the call has been terminated, remove the connection between network port 104a and instrument port 106a.
8. Determine if the call (in this example, the call between phone numbers 5551234 and 5555678) is re-established by continuing to examine packets or copies of packets.
9. If the call is re-established, then the above steps can be repeated. If new RTP port numbers are negotiated in re-establishing the call, then the above steps are repeated using the new RPT port numbers.
10. If the user issues a command to remove the filter for this VoIP call, then remove the filter and stop examining packets for this VoIP call.

As a further example, assume the VoIP call described above is handled using SIP. When the VoIP call is established, a dynamic RTP port number will be determined. The voice traffic passes through this RTP port number as packets. State-based filtering module 302 creates or modifies a filter to filter on this RTP port number until the call is terminated or the connection is broken as reported by some timeout event. Note, the SIP protocol can be used to establish many different types of sessions other than a VoIP session.

The following provides exemplary command line input commands that can be used to create a filter for filtering packets belonging to a phone call involving the phone number 5551234:

config port-type 1 network
config port-type 4 instrument
config connect 1 to 4
config appfilter allow appgroup voip protocol sip siptype phone phone 5551234 alias sipphone 1
config port-appfilter 1 sipphone 1

The first command configures port 1 as a network port. The second command configures port 4 as an instrument port. The third command establishes a connection between port 1 and port 4 (i.e., the network port and the instrument port).

The fourth command creates an application filter that allows all packets belong to phone number 5551234 to pass through. The "appgroup" field specifies the application as being VoIP. The "protocol" field specifies the protocol as being SIP. Since SIP can support many different types of sessions, the "siptype" field specifies the type as being phone.

The "phone" field specifies 5551234 as the phone number. An alias of "sipphone 1" is created for the phone number 5551234.

The fifth command assigns the application filter to port 1, which is a network port. Thus, in this example, the filter is an ingress filter. As noted above, the filter can be configured as an egress filter and assigned to port 4, which is an instrument port.

As noted above, state-based filtering module 302 can be implemented as computer executable instructions. With reference to FIG. 1, the computer executable instructions can be executed by processor 116 of packet switch appliance 102.

In particular, when the commands are entered, state-based filtering module 302 (FIG. 3) can set up a rough filter to direct all SIP traffic to processor 116. Processor 116 examines the packets, determines the SIP protocol states, builds up data structures that reflect the state machine of the particular state-based protocol being monitored, until the SIP VoIP session for this phone number (5551234) is initiated. From examining the packets, processor 116 determines the dynamic RTP port number that will be used to pass the VoIP traffic. Processor 116 then sets up a hardware filter using this RTP port number so that only the traffic that enters network port 104a and is related to phone number 5551234 will be sent to instrument port 106a. Processor 116 continues to examine SIP packets for this phone number. If there is a hang-up (session termination), processor 116 removes the filter at network port 104a. Also, if the connection is broken as reported by some timeout event (e.g., no relevant SIP or VoIP RTP packets pass through over a specified period of time), then processor 116 removes the filter at network port 104a.

In one exemplary embodiment, rather than directing all traffic to processor 116, a hardware filter can be used to only direct traffic specific to a specific flow to processor 116. In particular, in certain protocols, the first packet of a flow can be identified by examining for a specific pattern in a specific field, which is located at a fixed offset from the beginning of packets. For example, for VoIP over SIP, the first packet for the initialization of a phone call to phone number 5551234 can be identified by examining for an SIP packet that has the INVITE operator in the SIP header and the phone number 5551234, which are fields located at fixed offsets from the beginning of packets. In this manner, the amount of traffic having to be processed by processor 116 is reduced.

The examples above involved filtering based on a single phone number. It should be recognized, however, that appropriate command line input commands can be used to create filters to perform more sophisticated filtering of phone numbers.

For example, the "phone" field mentioned above can include multiple terms using various syntax. Two terms are separated by a term divider, such as a semicolon. Each term can include one or more "from" phones and one or more "to" phones. Multiple "from" phones and/or "to" phones can be separated using various symbols. For example, a "|" symbol can be used to separate multiple "from" phones and/or "to" phones. Also, various symbols can be used to specify relationships between the "from" phones and the "to" phones. For example, a ">" symbol can be used to specify that the "from" phones and "to" phones can not be interchanged, and a "^" symbol can be used to specify that the "from" phone and "to" phones can be interchanged.

As one example of a more sophisticated filtering of phone numbers, assume the "phone" field is "4085551234|4085555678>01178121234567;4085552345^4155556789". The first term ("4085551234|4085555678>01178121234567") means that either of "from" phone 4085551234 or phone 4085555678 makes calls to international "to" phone 01178121234567. In the first term, because the "from" phones and the "to" phone are separated by the ">" symbol, the "from" phones and the "to" phone cannot be interchanged. Thus, packets related to a call from phone 01178121234567 to either phone 4085551234 or phone 4085555678 will not be filtered. The second term ("4085552345^4155556789") means that phone 4085552345 calls phone 4155556789. In the second term, because the "from" phone and the "to" phone are separated by the "^" symbol, the "from" phone and the "to" phone can be interchanged. Thus, packets related to a call from phone 4085552345 to phone 4155556789 as well packets related to a call from phone 4155556789 to phone 4085552345 will be filtered.

In addition to phone numbers, the "phone" field can use codes to specify phone regions. For example, the following codes can be used to specify the following four typical phone regions:

O—Office call, which includes no more than 3 digits and contains characters other than digits in the U.S.;
L—Local call, which includes no more than 8 digits in the U.S.;
D—Long distance call, which includes no more than 11 digits in the U.S.; and
I—International call, which includes more digits than a long distance call.

As one example of a more sophisticated filtering of phone numbers, assume the "phone" field is "4085551234|4155555678^I;5105552345". The first term ("4085551234|4085555678^I") means that either of "from" phone 4085551234 or phone 4085555678 makes or receives international calls. The second term ("5105552345") means that phone 5105552345 can either call any number or receive calls from any number.

The above examples relate to handling VoIP calls using SIP protocol. It should be recognized, however, that process 200 can be used with regard to various state-based protocols. For example, FIG. 4 depicts a hierarchy of various VoIP protocols. FIG. 5 also depicts a hierarchy of e-mail protocols.

As mentioned above, packet switch appliance 102 (FIG. 1) can perform various port distributions, such as one-to-one, one-to-many, many-to-one, and many-to-many. FIG. 1 depicts a one-to-one port distribution (i.e., packets are distributed from network port 104a to instrument port 106a).

FIG. 6 depicts packet switch appliance 102 having ports configured as instrument ports 106a and 106b. In this exemplary embodiment, packet switch appliance 102 can perform one-to-one port distributions by sending packets or copies of packets received through network port 104a to state-based filtering module 302, which can create or modify one or more filters to forward filtered packets or copies of packets to instrument port 106a or instrument port 106b. In this exemplary embodiment, packet switch appliance 102 can also perform one-to-many port distributions by sending packets or copies of packets received through network port 104a to state-based filtering module 302, which can create or modify one or more filters to forward filtered packets or copies of packets to instrument ports 106a and 106b.

FIG. 7 depicts packet switch appliance 102 having ports configured as network ports 104a, 104b and instrument ports 106a, 106b. In this exemplary embodiment, packet switch appliance 102 can perform many-to-one port distributions by sending packets or copies of packets received through network ports 104a and 104b to state-based filtering module 302, which can create or modify one or more filters to forward filtered packets or copies of packets to instrument port 106a or instrument port 106b. In this exemplary embodiment, packet switch appliance 102 can also perform many-to-many port distributions by sending packets or copies of packets received through network ports 104a and 104b to state-based filtering module 302, which can create or modify one or more filters to forward filtered packets or copies of packets to instrument ports 106a and 106b.

With reference again to FIG. 1, packet switch appliance 102 can include a network switch chip 114, processor 116, and memory 118. In the present exemplary embodiment, the state-based filtering process described above can be performed used network switch chip 114, processor 116, and memory 118. Any software, including the operating system and software to implement process 200 (FIG. 2), needed to operate packet switch appliance 102 can be stored as computer-executable instructions stored on computer-readable storage medium 120. It should be recognized, however, that any one or more of these components can be omitted or any number of additional components can be added to packet switch appliance 102.

With reference to FIG. 8, packet switch appliance 102 may include a mother board 802, which is the central or primary circuit board for the appliance. A number of system components may be found on mother board 802. System central processing unit (CPU) 804, corresponding to processor 116 in FIG. 1, interprets programming instructions and processes data, among other functions. Network switch chip 114, also referred to as an "ethernet switch chip" or a "switch-on-a-chip", provides packet switching and filtering capability in an integrated circuit chip or microchip design.

In one exemplary embodiment, process 200 (FIG. 2) can be performed using system CPU 804. In particular, state-based filtering module 302 (FIG. 3) can be implemented as a software module running on system CPU 804, which can be connected to a CPU port of network switch chip 114. Packets or copies of packets entering an ingress port of network switch chip 114 can be forwarded to system CPU 804, where system CPU 804 can examine the packets or copies of packets as part of the state-based filtering process described above. System CPU 804 can create or modify one or more filters on network switch chip 114 to implement the state-based filtering process described above.

System CPU 804 may not be able to handle the packets or copies of packets forwarded from network switch chip 114, particularly if packets are entering the ingress port at line rate. Thus, in the present exemplary embodiment, state-based filtering module 302 (FIG. 3) can be configured to set up a rough egress filter at the CPU port of network switch chip 114 so that only a subset of the ingress packets are forwarded to system CPU 804. For example, if a particular state-based protocol always runs through the TCP state, then state-based filtering module 302 (FIG. 3) can be configured to set up an egress filter at the CPU port of network switch chip 114 to pass only the TCP packets to system CPU 804 for the state-based filtering process.

As depicted in FIG. 8, packet switch appliance 102 can include a connector 806 on mother board 802. Connector 806 provides mother board 802 with the capacity to removably accept peripheral devices or additional boards or cards. In one embodiment, connector 806 allows a device, such as a daughter or expansion board, to directly connect to the circuitry of mother board 802. Mother board 802 may also comprise numerous other components such as, but not limited to, volatile and non-volatile computer readable storage media, display processors, and additional peripheral connectors. The packet switch appliance may also be configured with one or more hardware ports or connectors for connecting servers, terminals, IP phones, network instruments, or other devices to the packet switch appliance.

In the embodiment of packet switch appliance 102 depicted in FIG. 8, a daughter board 808 is configured to be removably connected to mother board 802. Daughter board 808 can be configured with a processor unit 810 and memory 812. In this exemplary embodiment, process 200 (FIG. 2) can be performed using processor unit 810 in place of or in support of system CPU 804. Processor unit 810 may be any integrated circuit capable of routing and processing packets. Preferably, processor unit 810 may be, but is not limited to, an field programmable gate array (FPGA), network processor unit (NPU), multi-core processor, multi-core packet processor, or an application specific integrated circuit (ASIC). Memory 812 may be any computer readable storage medium or data storage device such as RAM or ROM. In one embodiment, processor unit 810 and memory 812 may be connected. In such an embodiment, processor unit 810 may contain firmware having computer programming instructions for buffering data packets on memory 812. As with motherboard 802, daughter board 808 may also comprise numerous other components. For additional description of a packet switch appliance with a daughter board, see U.S. patent application Ser. No. 11/796,001, filed on Apr. 25, 2007, which is incorporated herein by reference in its entirety for all purposes.

Although exemplary embodiments have been described, various modifications can be made without departing from the spirit and/or scope of the present invention. Therefore, the present invention should not be construed as being limited to the specific forms shown in the drawings and described above.

We claim:

1. A method of configuring a packet switch appliance connected to a packet-switching network, wherein the packet switch appliance includes a plurality of ports, wherein one of the plurality of ports is configured to operate as a first network port for connection to the packet-switching network, wherein another one of the plurality of ports is configured to operate as a first instrument port for connection to a first network monitoring instrument, the method comprising:
examining one or more packets or copies of packets received through the first network port to determine a current state of a state-based protocol prior to the packets or copies of packets being sent out the first instrument port for processing by the first network monitoring instrument, wherein the state-based protocol includes a plurality of potential states; and
creating or modifying a filter for the first network port or the first instrument port based on the determined current state of the state-based protocol;
wherein the filter created or modified based on the determined current state of the state-based protocol is configured to filter packets or copies of packets for processing by at least the first network monitoring instrument;
wherein the state-based protocol involves an attribute value that changes with a state change, and wherein the attribute value comprises a port number that is dynamically negotiated.

2. A method of configuring a packet switch appliance connected to a packet-switching network, wherein the packet switch appliance includes a plurality of ports, wherein one of the plurality of ports is configured to operate as a first network port for connection to the packet-switching network, wherein another one of the plurality of ports is configured to operate as a first instrument port for connection to a first network monitoring instrument, the method comprising:

examining one or more packets or copies of packets received through the first network port to determine a current state of a state-based protocol prior to the packets or copies of packets being sent out the first instrument port for processing by the first network monitoring instrument, wherein the state-based protocol includes a plurality of potential states; and creating or modifying a filter for the first network port or the first instrument port based on the determined current state of the state-based protocol;

wherein the filter created or modified based on the determined current state of the state-based protocol is configured to filter packets or copies of packets for processing by at least the first network monitoring instrument;

wherein the act of creating or modifying the filter comprises setting or adjusting one or more values of one or more filter criteria, and wherein the one or more filter criteria is for filtering based on a negotiated port number.

3. The method of claim 1, further comprising assigning the filter to the first network port or the first instrument port.

4. The method of claim 1, wherein the act of creating or modifying the filter comprises adjusting one or more values of one or more criteria of the filter to use in filtering the packets if the determined current state of the state-based protocol has changed.

5. The method of claim 1, wherein the act of creating or modifying the filter comprises deleting the filter if the determined current state of the state-based protocol has changed.

6. The method of claim 1, further comprising:
identifying a first packet of a specific flow by examining a field at a prescribed offset from a beginning of the first packet; and
after identifying the first packet, directing only traffic specific to the specific flow to a processor to be processed.

7. The method of claim 1, wherein the act of examining is performed using a state-based filtering module in the packet switch appliance.

8. The method of claim 1, further comprising configuring another one of the plurality of ports at the packet switch appliance to operate as a second instrument port for connection to a second network monitoring instrument.

9. The method of claim 8, wherein the filter is created or modified to forward filtered packets or copies of packets to the first instrument port or the second instrument port.

10. The method of claim 8, wherein the filter is created or modified to forward filtered packets or copies of packets to the first instrument port and the second instrument port.

11. The method of claim 1, further comprising configuring another one of the plurality of ports at the packet switch appliance to operate as a second network port for connection to the packet-switching network, wherein the filter is created or modified to filter packets or copies of packets from the first network port and the second network port, and wherein the filter is created or modified to forward filtered packets or copies of packets to the first instrument port.

12. The method of claim 11, further comprising configuring another one of the plurality of ports at the packet switch appliance to operate as a second instrument port for connection to a second network monitoring instrument, wherein the filter is created or modified to forward filtered packets or copies of packets to the first instrument port and the second instrument port.

13. The method of claim 1, wherein the act of creating or modifying the filter is dynamically performed at the packet switch appliance.

14. The method of claim 1, wherein the packet switch appliance is configured to communicate with a firewall at the packet-switching network.

15. The method of claim 1, wherein the act of creating or modifying the filter comprises setting one or more filter criteria based on the negotiated port number.

16. A packet switch appliance configured to be connected to a packet-switching network, the packet switch appliance comprising:
a plurality of ports, wherein one of the plurality of ports is configured to operate as a first network port for connection to the packet-switching network, and wherein another of the plurality of ports is configured as a first instrument port for connection to a first network monitoring instrument; and
a non-transitory computer-readable storage medium containing computer-executable instructions to operate the packet switch appliance, wherein the executable instructions comprise instructions for:
examining one or more packets or copies of packets received through the first network port to determine a current state of a state-based protocol prior to the packets or copies of packets being sent out the first instrument port for processing by the first network monitoring instrument, wherein the state-based protocol includes a plurality of potential states; and
creating or modifying a filter for the first network port or the first instrument port based on the current state of the state-based protocol determined by the packet switch appliance;
wherein the filter created or modified based on the determined current state of the state-based protocol is configured to filter packets or copies of packets for processing by at least the first network monitoring instrument;
wherein the state-based protocol involves an attribute value that changes with a state change, and wherein the attribute value comprises a port number that is dynamically negotiated.

17. A packet switch appliance configured to be connected to a packet-switching network, the packet switch appliance comprising:
a plurality of ports, wherein one of the plurality of ports is configured to operate as a first network port for connection to the packet-switching network, and wherein another of the plurality of ports is configured as a first instrument port for connection to a first network monitoring instrument; and
a non-transitory computer-readable storage medium containing computer-executable instructions to operate the packet switch appliance, wherein the executable instructions comprise instructions for:
examining one or more packets or copies of packets received through the first network port to determine a current state of a state-based protocol prior to the packets or copies of packets being sent out the first instrument port for processing by the first network monitoring instrument, wherein the state-based protocol includes a plurality of potential states; and
creating or modifying a filter for the first network port or the first instrument port based on the current state of the state-based protocol determined by the packet switch appliance;
wherein the filter created or modified based on the determined current state of the state-based protocol is configured to filter packets or copies of packets for processing by at least the first network monitoring instrument;

wherein the instruction for creating or modifying the filter comprises instruction for setting or adjusting one or more values of one or more filter criteria, and wherein the one or more filter criteria is for filtering based on a negotiated port number.

18. The packet switch appliance of claim 16, wherein the computer-readable storage medium further comprises instruction for assigning the filter to the first network port or the first instrument port.

19. The packet switch appliance of claim 16, wherein the instruction for creating or modifying the filter comprises instruction for adjusting one or more values of one or more criteria of the filter to use in filtering the packets if the determined current state of the state-based protocol has changed.

20. The packet switch appliance of claim 16, wherein the instruction for creating or modifying the filter comprises instruction for deleting the filter if the determined current state of the state-based protocol has changed.

21. The packet switch appliance of claim 16, wherein the packet switch appliance is configured for:
   identifying a first packet of a specific flow by examining a field at a prescribed offset from a beginning of the first packet; and
   after identifying the first packet, directing only traffic specific to the specific flow to a processor to be processed.

22. The packet switch appliance of claim 16, further comprising a state-based filtering module for examining the one or more packets or copies of packets.

23. The packet switch appliance of claim 16, wherein the packet switch appliance is configured to have another one of the plurality of ports at the packet switch appliance operate as a second instrument port for connection to a second network monitoring instrument.

24. The packet switch appliance of claim 23, wherein the filter is created or modified to forward filtered packets or copies of packets to the first instrument port or the second instrument port.

25. The packet switch appliance of claim 23, wherein the filter is created or modified to forward filtered packets or copies of packets to the first instrument port and the second instrument port.

26. The packet switch appliance of claim 25, wherein the packet switch appliance is configured to have another one of the plurality of ports at the packet switch appliance operate as a second network port for connection to the packet-switching network, wherein the filter is created or modified to filter packets or copies of packets from the first network port and the second network port, and wherein the filter is created or modified to forward filtered packets or copies of packets to the first instrument port.

27. The packet switch appliance of claim 25, wherein the packet switch appliance is configured to have another one of the plurality of ports at the packet switch appliance operate as a second instrument port for connection to a second network monitoring instrument, wherein the filter is created or modified to forward filtered packets or copies of packets to the first instrument port and the second instrument port.

28. The packet switch appliance of claim 16, wherein the packet switch appliance is configured to create or modify the filter dynamically.

29. The packet switch appliance of claim 16, wherein the packet switch appliance is configured to communicate with a firewall at the packet-switching network.

30. The packet switch appliance of claim 16, wherein the instruction for creating or modifying the filter comprises instruction for setting one or more filter criteria based on the negotiated port number.

\* \* \* \* \*